(Model.)

J. M. SPRINGER.
FRUIT DRYING RACK.

No. 333,897. Patented Jan. 5, 1886.

Witnesses:
J. R. Brinker
T. J. Purnell

Inventor:
Jacob M. Springer

UNITED STATES PATENT OFFICE.

JACOB M. SPRINGER, OF MOUNT ERIE, ILLINOIS.

FRUIT-DRYING RACK.

SPECIFICATION forming part of Letters Patent No. 333,897, dated January 5, 1886.

Application filed July 24, 1885. Serial No. 172,573. (Model.)

*To all whom it may concern:*

Be it known that I, JACOB M. SPRINGER, a citizen of the United States, residing at Mount Erie, in the county of Wayne and State of Illinois, have invented certain new and useful Improvements in Fruit Racks or Frames for Drying, Desiccating, or Evaporating Fruit or Vegetables; and I do hereby declare that the following is a full, clear, and exact description of my invention, which will enable others skilled in the art to which it appertains to make and use the same.

Heretofore when fruit or vegetables have been dried in the sun they have been placed on boards or the roof of a house, or placed on wooden trays or trays with wire-cloth bottoms, thereby exposing but one side of the fruit or vegetables to the sun and air. When fruit and vegetables are dried or evaporated in dry-houses or fruit-evaporators, they are universally placed on trays or frames with wire-cloth bottoms, which trays, when covered with fruit or vegetables, allow no current of air to pass through them, which retards evaporation and drying.

The object of my invention is to place a cheap and valuable article within the reach of all, to dry or evaporate fruit and vegetables with less labor and less time than has ever before been accomplished.

Figure 1:
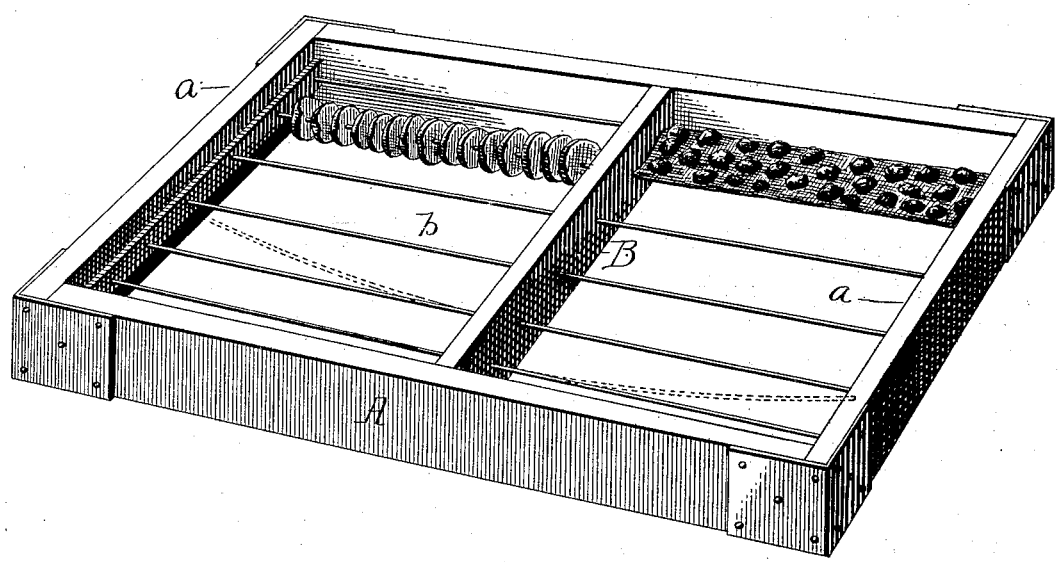
Figure 2:
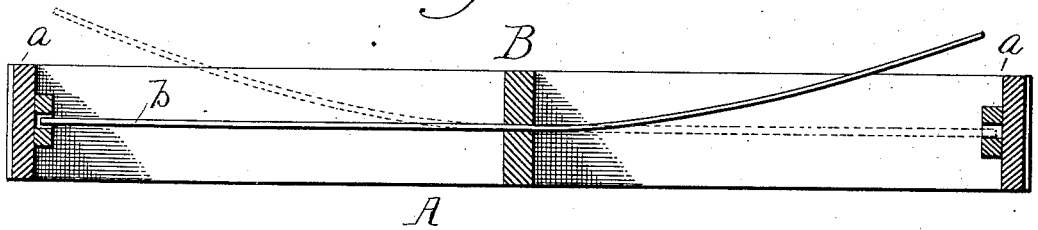

In the accompanying drawings, forming part of this specification, Figure 1 is a perspective view of a drying-frame embodying my invention, and Fig. 2 is a central longitudinal section of said frame.

To carry my invention into effect, I first make a frame or rack, A, of any given size. It may be oblong or square. I place one or more center bars, B, in the frame, according to the size of the frame. I then perforate at regular intervals the center bar or bars and the two sides *a a* directly opposite the center bar or bars. The holes thus made in center bar and sides must be in a straight line with each other. I then place adjustable rods *b* in the frames by running them through the center bar in the hole opposite in the side of frames, and then spring the other end into place on the other side. The rods *b* must be cut in proper lengths, according to size of rack or frame. The rods *b* are preferably made of spring steel wire.

To place fruit or vegetables on these frames, I take apples, pears, or quinces, pared and cored or sliced in rings, and spring the rod *b* out of place on one side of frame, as shown in Fig. 2, and string the fruit on the rod, and then spring the rod back in place. After filling one side of frame I turn it over and fill the other side. Fruit and vegetables that cannot be pared and cored and left otherwise whole or sliced in rings can be pierced by the rod. Small fruits and vegetables—such as cherries, corn, &c.—are placed on muslin stretched from one rod to the rod next to it, thereby leaving a space or flue for the heat or air to pass between those two rods and the next two.

The advantages of my rack or frame are, when placed in a fruit-evaporator or dry-house, each frame above the other, the fruit or vegetables being placed on rods at regular intervals, the rods in one frame will be directly above the rods in the frame below, thus forming a hot-air flue from bottom to top of evaporator or dry-house. The heat is distributed immediately and evenly to all the fruit or vegetables, thereby drying or evaporating in less time than any other way. In case the under side of the fruit or vegetables gets too hot, the frame can be turned over in an instant without removing the fruit or vegetables.

For the benefit of persons who cannot afford to buy fruit-evaporators or dry-houses, they can place their fruit or vegetables on these frames and hang them out in the sun, which will be a great improvement over the old way of spreading them out on boards, as in case of a sudden rain or when night comes they can be carried in shelter in a very short time, and the fruit or vegetables being strung on rods and hung in the sun, instead of spread on boards, the sun and air can approach them on all sides.

Having fully described my invention, what I desire to claim and secure by Letters Patent is—

1. The combination, in a fruit-drier, of a frame provided at opposite sides with a series of registering-recesses and a series of spring-bars, each adapted to have one end inserted in one of the recesses and the other end sprung into the corresponding recess of the opposite bar, substantially as set forth.

2. The combination of the frame A, having its sides $a\ a$ each provided with a series of recesses, a bar, B, provided with a series of registering-recesses, and a series of spring-bars, $b$, for the purpose specified.

JACOB M. SPRINGER.

Attest:
J. S. MUNDY,
E. BLACKFORD.